3,558,675
STEROID CARBONATES AND PROCESS
Lewis H. Sarett, Princeton, and Thomas B. Windholz, Westfield, N.J., assignors to Merck & Co., Inc., Rahway, N.J., a corporation of New Jersey
No Drawing. Continuation of application Ser. No. 620,656, Mar. 6, 1967. This application June 30, 1969, Ser. No. 842,788
Int. Cl. C07c 167/28
U.S. Cl. 260—397.4     3 Claims

ABSTRACT OF THE DISCLOSURE

The invention disclosed herein is concerned generally with novel steroid carbonates and processes for preparing them. More particularly, it relates to 17-alkyl, aryl and aralkyl) carbonate esters of 17α-hydroxy-20-keto-steroids of the saturated and unsaturated pregnane series; and with processes for preparing these saturated and unsaturated 17α-hydroxy-20-keto-pregnane-17-carbonates by first reacting the free 17α-hydroxy-steroid with an organo metallic compound, and then reacting the metal 17-olate thus produced with an alkyl chloroformate, aryl chloroformate or aralkyl chloroformate. These new 17α-hydroxy-20-keto-pregnane-17-(alkyl, aryl and aralkyl) carbonates possess progestational activity and are valuable as esterus regulating agents.

---

This is a continuation of application Ser. No. 620,656 filed Mar. 6, 1967 and now abandoned.

The novel 17α-hydroxy - 20 - keto-pregnane-17-(alkyl, aryl and aralkyl) carbonates, which are also referred to as 17α(alkoxy, aryloxy and aralkoxy)-carbonyloxy-20-keto-pregnanes may be chemically represented, insofar as Ring D of the steroid nucleus and substituents attached thereto are concerned, as follows:

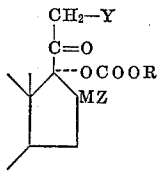

wherein Y is halo or hydrogen; Z is hydrogen, α-halo, α-hydroxy, α-alkyl, β-alkyl or methylene; and R is lower alkyl, aryl or aralkyl; as previously noted, the subject steroids belong to the saturated and unsaturated pregnane series, an the expression "17α-hydroxy-20-keto-pregnane," as used herein, includes within its scope saturated pregnanes and unsaturated pregnenes, pregnadienes, pregnatrienes, etc., which may contain one or more unsaturated linkages, preferably in positions 2(3), 4(5), 5(6), 6(7), 9(11) and/or 11(12).

The new 17-carbonate esters, subject of the present invention, may be prepared by reacting the 17α-hydroxy-20-keto-pregnane, after suitably protecting other free-hydroxyl groupings (and keto groupings if desired), with an organo metallic compound, as for example a Grignard reagent such as methyl magnesium chloride, an alkyl or aryl metallo derivative such as methyl lithium and the like, to form the corresponding metal 17-olate, which is then reacted with an alkyl chloroformate or cyclohexyl orthoformate; an aryl chloroformate; or an aralkyl chloroformate, such as benzyl chloroformate; and the like, thereby producing the 17α-hydroxy-20-keto-pregnane-17-(alkyl, aryl or aralkyl) carbonates.

The reaction between the 17α-hydroxy-20-keto-pregnane and the organo metallic compound is carried out by bringing the reactants together under substantially anhydrous conditions in the presence of an oxygenated organic solvent, preferably an ethereal solvent such as diethyl ether. It is often desirable to protect the 17-keto as well as other reactive grouping, e.g. 3-keto group, by conversion to a base-stable protecting group for example ethers, ketals, such as dioxolane, and the like. The reaction can preferably be carried out by dissolving the 17α-hydroxy-20-keto-pregnane in a dry hydrocarbon solvent such as benzene, and adding the resulting benzene solution to a solution of methyl lithium in diethyl ether. The reaction to form the steroid lithium 17-olate commences, with concomitant precipitation, at room temperature, but it is ordinarily preferred to heat the reaction mixture under reflux, under which conditions the reaction is ordinarily complete in about one-half hour.

An ethereal solution of the desired alkyl, aryl or aralkyl chloroformate in dry diethyl ether is then added to the reaction mixture containing the steroid lithium 17-olate, and the resulting mixture is stirred at room temperature until the reaction is substantially complete, which ordinarily takes approximately 15 to 20 hours. The resulting mixture is then extracted with an aqueous alkaline solution, such as aqueous sodium bicarbonate solution, and the organic phase dried, evaporated under reduced pressure, and the residual material purified by chromatography to give substantially pure 17α-hydroxy-20-keto-pregnane 17-(alkyl, aryl or aralkyl) carbonate.

The 17α-hydroxy-20-keto-pregnane starting materials ordinarily employed in the presently invented procedure may, as previously noted, possess unsaturated linkages in positions 2(3), 4(5), 5(6), 6(7), 9(11) and/or 11(12), and may contain, in addition to the 20-keto substituent, one or more of the following functionalities, alternatively or simultaneously: $C_1$ halogen; $C_2$ alkyl; $C_1$–$C_2$ exomethylene; $C_3$ hydroxy, acyloxy or keto; $C_4$ hydroxy or halo; $C_6$ methyl or halo bromo, chloro or fluoro); $C_{10}$ methyl or hydrogen; $C_9$ hydrogen or halogen (bromo, chloro or fluoro); $C_{11}$ hydroxy or halo (preferably chloro); $C_{16}$ halo (preferably α-fluoro or α-chloro), α-hydroxy, methylene or alkyl (preferably α-methyl or methylene); $C_{21}$ hydrogen or halo (preferably fluoro), and the like. These 17α-hydroxy-20-keto-pregnane starting materials thus include 6-chloro-17α-hydroxy-pregna-4,6-diene-3,20 - dione; 6-chloro-17α-hydroxy - 16α-methyl-pregna-4,6-diene-3,20-dione; 3-acetoxy-6-chloro-17-α - hydroxy-pregna-2,4,6-triene-20-one; 6-methyl-16-methylene-17α-hydroxy - pregna-4,6-diene-3,20-dione; 3-acetoxy-6 - methyl-16-methylene-17α - hydroxy - pregna - 2,4,6-triene-20-one; 9α-fluoro-11β,17α-dihydroxy-pregn-4-ene-3,20 - dione; 9α - fluoro-11β,17α - dihydroxy - 16α-methyl-pregn-4-ene-3,20-dione; 9α-fluoro-11β,17α-dihydroxy-16-methylene - pregn-4-ene-3,20-dione; 6,16α-dimethyl-17α-hydroxy-pregna-4,6-diene-3,20-dione; 6,16α - dimethyl - 17α - hydroxy - 21 - fluoro-pregna - 4,6-diene-3,20-dione; 6-methyl-16-methylene-17α-hydroxy-21-fluoro-pregna-4,6-diene-3,20-dione; 6 - chloro-16-methylene-17α-hydroxy-pregna-4,6-diene-3,20 - dione; 6α-methyl-17a-hydroxy-pregn-4-ene-3,20 - dione, and the like.

In accordance with the presently invented procedure, the 17α-hydroxy-20-keto-pregnane starting materials are converted to the corresponding 17α-hydroxy - 20 - keto-pregnane 17-(alkyl, aryl or aralkyl) carbonate as, for example, 6-chloro-17α-hydroxy-pregna - 4,6 - diene - 3,20-dione 17-methyl carbonate; 6-chloro-17α-hydroxy-16α-methyl - pregna-4,6-diene-3,20-dione 17-ethyl carbonate; 3-acetoxy-6 - chloro - 17α-hydroxy-pregna-2,4,6-triene-20-one 17-benzyl carbonate; 6-methyl-16-methylene-17a- hydroxy-pregna-4,6-diene-3,20-dione 17 - methyl carbonate; 3-acetoxy -6-methyl - 16 - methylene-17α-hydroxy-pregna-2,4,6 - triene - 20 - one 17-ethyl carbonate; 9α-fluoro-11β, 17α-dihydroxy-pregna-4-ene-3,20-dione 17 - methyl carbonate; 9α-fluoro - 11β,17α - dihydroxy-16α-methyl-pregn- 4-ene-3,20-dione 17 - cyclohexyl carbonate; 9α - fluoro-11β,17α - dihydroxy-16-methylene-pregn-4-ene-3,20-dione 17 - methyl carbonate; 6,16α - dimethyl - 17α-hydroxy-pregna-4,6-diene-3,20-dione 17 - benzyl carbonate; 6,16α-dimethyl - 17α - hydroxy-21-fluoro-pregna-4,6-diene-3,20-dione 17 - propyl carbonate; 6-methyl-16-methylene-17α-hydroxy - 21 - fluoro - pregna - 4,6-diene-3,20-dione 17-methyl carbonate; 6 - chloro - 16 - methylene-17α-hydroxy-pregna - 4,6 - diene - 3,20-dione 17-ethyl carbonate; 6α - methyl - 17α - hydroxy-pregn-4-ene-3,20-dione 17-methyl carbonate and the like.

The following examples illustrate methods of carrying out the present invention, but it is to be understood that these examples are given for purposes of illustration and not of limitation.

EXAMPLE 1

Approximately 250 mg. of 6-methyl-16-methylene-17α-hydroxy-pregna-4,6-diene-3,20-dione is dissolved in 12 ml. of benzene and the resulting solution dried by azeotropically distilling from the resulting solution 2 ml. of solvent. This dry benzene solution is then added to 10 ml. of a dry ether solution of methyl lithium containing approximately 28.6 mg. of methyl lithium. The resulting mixture is heated under reflux for approximately one-half hour, and the reaction mixture, containing 6-methyl-16-methylene-pregna-4,6-diene-3,20-dione-lithium 17-olate, is cooled to room temperature.

To the cooled reaction mixture is then added a solution containing 0.11 ml. methyl chloroformate in 10 ml. dry ether, and the resulting mixture is stirred at room temperature for a period of approximately 16 hours. The reaction mixture is then poured into a mixture of ice and aqueous sodium bicarbonate solution, the organic phase is separated, and the aqueous layer extracted with ether. The combined organic phase is dried over magnesium sulfate, and the solvent evaporated therefrom under reduced pressure to give about 330 mg. of residual material, which is obtained in the form of a foam. A 110 mg. aliquot of this material is spotted on two 8" x 8" silica gel thin layer plates, and subjected to liquid chromatography utilizing benzene/ether (1:1) to give approximately 45 mg. of the 17 - methyl carbonate of 6 - methyl - 16 - methylene-17α-hydroxy-pregna-4,6-diene-3,20 - dione and approximately 30 mg. of unchanged starting material.

In accordance with the foregoing procedure, but utilizing ethyl chloroformate in place of the methyl chloroformate there employed, there is obtained the 17-ethyl carbonate of 6-methyl-16-methylene-17α-hydroxy-pregna-4,6-diene-3,20-dione.

EXAMPLE 2

To a solution of approximately 1.6 grams of methyl lithium in 230 ml. of dry diethyl ether is added a solution of 2.5 grams of the 3,20-bis-dioxolane of 6α-methyl-17α - hydroxy-pregn-4-ene-3,20 - dione in 100 ml. of benzene. The resulting mixture is heated under reflux for approximately one-half hour. The reaction mixture containing the 3,20-bis-dioxolane of 6α-methyl-pregn-4-ene-3,20-dione lithium 17-olate is cooled to room temperature and to the cooled mixture is then added a solution of 6.5 ml. of methyl chloroformate in 25 ml. dry ether over a period of about 5 minutes. During the addition, a rise in temperature occurs, and a white precipitate forms. The resulting mixture is then stirred at approximately room temperature for a period of about 16 hours, at the end of which time the reaction is substantially complete. The reaction mixture is poured into a mixture of ice and aqueous sodium bicarbonate solution, the organic phase separated, and the steroid product recovered from the organic phase and chromatographed as described in Example 1 to give approximately 1.65 grams of the 3,20-bis-dioxolane of 6α - methyl-17α-hydroxy-4-pregn-4-ene-3,20-dione 17-methyl carbonate; M.P. 171–174° C.

EXAMPLE 3

To a solution of 150 ml. of acetone containing 150 mg. of p-toluene sulfonic acid is added 950 mg. of the 3,20-bis-dioxolane of 6α-methyl-17α-hydroxy-pregn-4-ene-3,20-dione 17-methyl carbonate, and the resulting solution is stirred at room temperature for approximately 3 hours under a nitrogen atmosphere. The hydrolysis mixture is then poured into a mixture of ice and sodium bicarbonate solution, the aqueous mixture is extracted with benzene, and the bicarbonate solution dried and evaporated to give approximately 700 mg. of the 3-mono-dioxolane of 6α-methyl-17α-hydroxy-pregn-4-ene-3,20 - dione 17 - methyl carbonate which, upon chromatography, gives substantially pure material M.P. 162–165° C.

To a solution of 45 ml. of 85% aqueous acetic acid solution containing 5 mg. of p-toluene sulfonic acid is added 170 mg. of the 3-mono-dioxolane of 6α-methyl-17α-hydroxy-pregn-4-ene-3,20-dione 17-methyl carbonate, and the resulting solution is stirred at approximately room temperature for a period of about 24 to 30 hours, under a nitrogen atmosphere. The reaction mixture is diluted with water and extracted with chloroform; and the organic phase is washed with aqueous sodium bicarbonate, dried and evaporated to dryness to give approximately 150 mg. of the 17-methyl carbonate of 6α-methyl-17α-hydroxy-pregn-4-ene-3,20-dione which, upon chromatography, gives substantially pure material; M.P. 186–188° C.

EXAMPLE 4

Approximately 250 mg. of 6-chloro-17α-hydroxy-pregna-4,6-diene-3,20-dione is dissolved in 12 ml. of benzene and the resulting solution dried by azeotropically distilling from the resulting solution 2 ml. of solvent. This dry benzene solution is then added to 10 ml. of a dry ether solution of methyl lithium containing approximately 28.6 mg. of methyl lithium. The resulting mixture is heated under reflux for approximately one-half hour, and the reaction mixture, containing 6-chloro-pregna-4,6-diene-3,20-dione lithium 17-olate, is cooled to room temperature.

To the cooled reaction mixture is then added a solution containing 0.11 ml. methyl chloroformate in 10 ml. dry ether, and the resulting mixture is stirred at room temperature for a period of approximately 16 hours. The reaction mixture is then poured into a mixture of ice and aqueous sodium bicarbonate solution, the organic phase is separated, and the aqueous layer extracted with ether. The combined organic phase is dried over magnesium sulfate, and the solvent evaporated therefrom under reduced pressure to give about 330 mg. of residual material, which is obtained in the form of a foam. A 110 mg. aliquot of this material is spotted on two 8" x 8" silica gel thin layer plates, and subjected to liquid chromatography utilizing benzene/ether (1:1) are to give approximately 45 mg. of the 17-methyl carbonate of 6-chloro-17α-hydroxy-pregna-4,6-diene-3,20-dione. If, in the above method, ethyl chloroformate is used instead of methyl chloroformate, the product obtained is the 17-ethyl carbonate of 6-chloro-17α-hydroxy-pregna-4,6-diene-3,20-dione.

In accordance with the foregoing procedures, but utilizing 6-chloro-16-methylene-17α-hydroxy-pregna-4,6-diene-3,20-dione in place of the 6-chloro-17α-hydroxy-pregna-4,6-diene-3,20-dione starting material there employed, there are obtained, respectively, the 17-methyl carbonate of the 6-chloro-16-methylene-17α-hydroxy-pregna-4,6-diene-3,20-dione and the 17-ethyl carbonate of the 6-chloro-16-methylene-17α-hydroxy-pregna-4,6-diene-3,20-dione.

Various changes and modifications may be made in carrying out the present invention, without departing from the spirit and scope thereof. Insofar as these changes and modifications are in the purview of the annexed claims, they are to be considered as part of this invention.

What is claimed is:
1. The process which comprises reacting an organo metallic compound with a 17α-hydroxy-20-keto steroid having the following chemical structure in Ring D of the steroid nucleus:

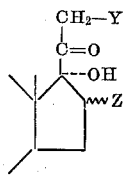

wherein Y is selected from the group consisting of fluoro and hydrogen; and Z is selected from the group consisting of hydrogen, α-chloro, α-fluoro, α-hydroxy, α-methyl and methylene radicals; thereby forming the corresponding 20-keto-steroid metal 17-olate, and reacting said 20-keto-steroid metal 17-olate with a chloroformic ester selected from the group which consists of alkyl chloroformate, and benzyl chloroformate to produce a 17α-hydroxy-20-keto-steroid 17-carbonate having in Ring D the following chemical structure:

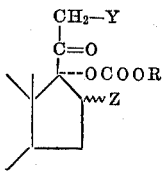

wherein R is selected from the group consisting of lower alkyl and aralkyl substituents, and Y and Z have the significance above-defined.

2. A process as defined in claim 1 in which the organo metallic compound is methyl lithium, the chloroformic ester is a lower alkyl chloroformate, and the product obtained is a 17α-hydroxy-20-keto-steroid 17-lower alkyl carbonate.

3. A process as defined in claim 1 in which the 17α-hydroxy-20-keto-steroid starting material is 6-methyl-16-methylene - 17α-hydroxy-pregna-4,6-diene-3,20-dione, the organic metallic compound is methyl lithium, the chloroformic ester is methyl chloroformate, and the product obtained is 6 - methyl-16-methylene-17α-hydroxy-pregna-4,6-diene-3,20-dione 17-methyl carbonate.

References Cited
UNITED STATES PATENTS

| | | | |
|---|---|---|---|
| 2,892,851 | 6/1959 | Bergstrom et al. | 260—397.45 |
| 3,138,589 | 6/1964 | Ringold et al. | 260—239.55 |
| 3,264,328 | 8/1966 | Jeger et al. | 260—397.3 |
| 3,312,692 | 4/1967 | Oliveto et al. | 260—239.5 |

ELBERT L. ROBERTS, Primary Examiner

U.S. Cl. X.R.

260—239.55, 397.45, 397.47